Figure 1:
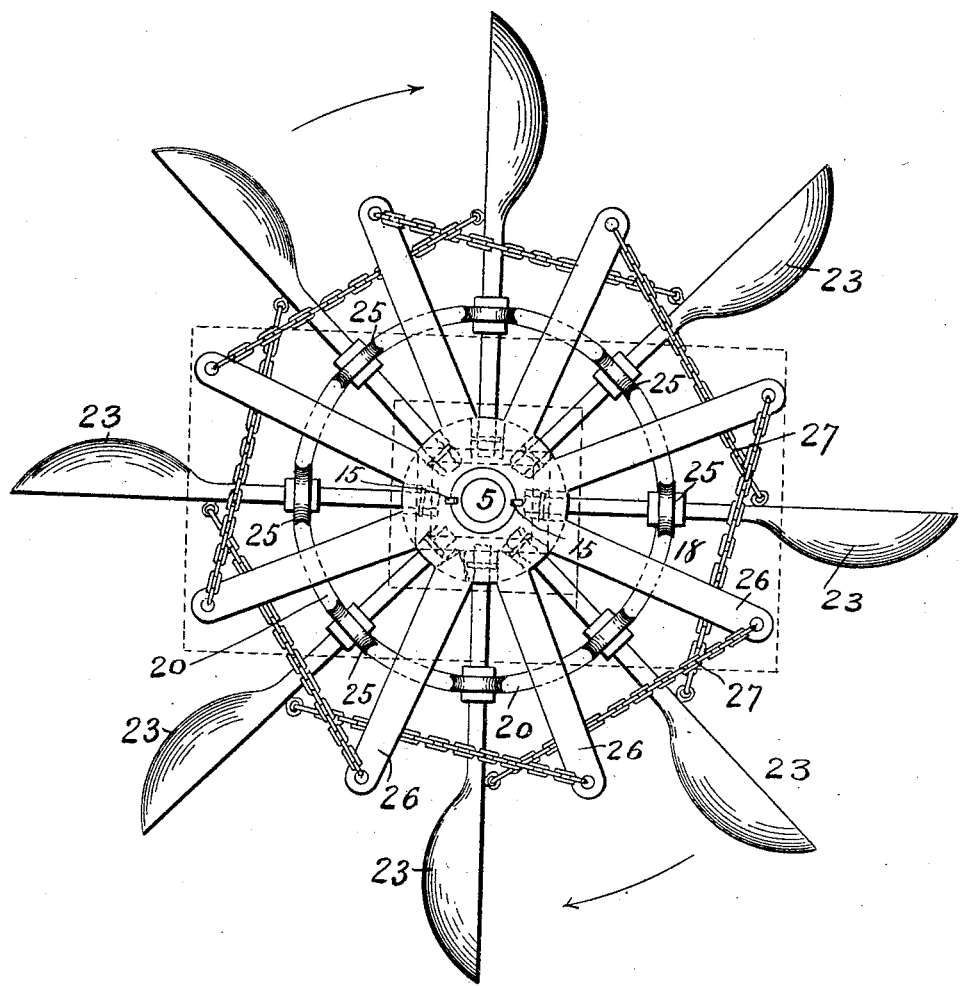

No. 803,377. PATENTED OCT. 31, 1905.
J. L. WEAVER.
CURRENT WATER WHEEL.
APPLICATION FILED APR. 14, 1905.

2 SHEETS—SHEET 1.

Witnesses
W. H. Durand
W. Parker Reinohl

Inventor
John L. Weaver
By D. C. Reinohl
Attorney

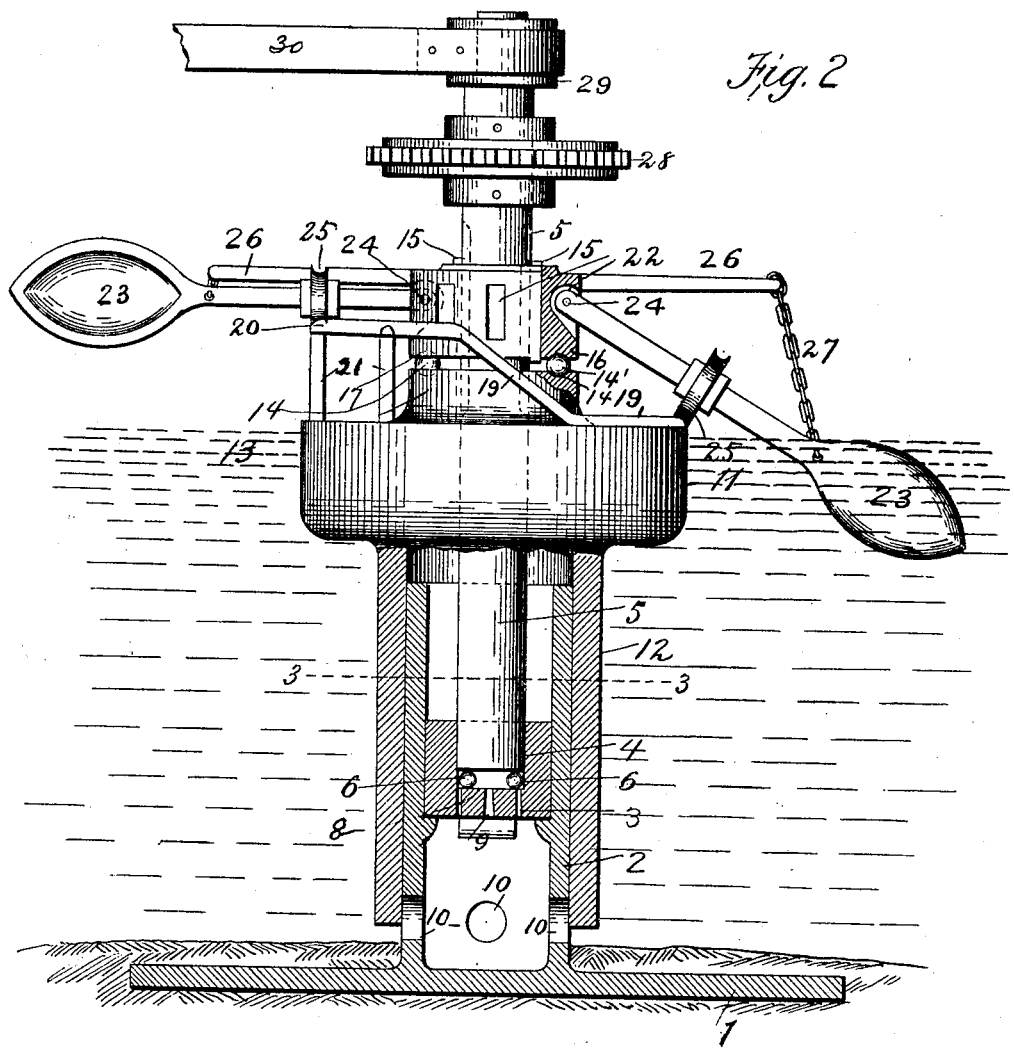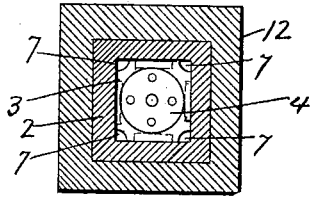

UNITED STATES PATENT OFFICE.

JOHN L. WEAVER, OF BOISE, IDAHO.

CURRENT WATER-WHEEL.

No. 803,377.  Specification of Letters Patent.  Patented Oct. 31, 1905.

Application filed April 14, 1905. Serial No. 255,554.

*To all whom it may concern:*

Be it known that I, JOHN L. WEAVER, a citizen of the United States, residing at Boise, in the county of Ada and State of Idaho, have invented certain new and useful Improvements in Current Water-Wheels; and I do hereby declare the following to be a full, clear, and exact description of the invention, such as will enable others skilled in the art to which it appertains to make and use the same.

My invention relates to water-wheels, has especial reference to that class of wheels designed to utilize the power of flowing streams of water, and has for its object to obtain the maximum power of the stream by reducing friction and the resistance of the paddles to the minimum.

The invention consists in certain improvements in construction, which will be fully disclosed in the following specification and claims.

In the accompanying drawings, which form part of this specification, Figure 1 represents a top plan view of a water-wheel of my improved construction with the pulley and gear-wheel removed; Fig. 2, a side elevation, partly in section; and Fig. 3, a transverse section on line 3 3, Fig. 2, with the shaft removed.

Reference being had to the drawings and the designating characters thereon, 1 indicates the base of the hollow column 2 and is designed to rest upon or may be embedded in the bottom or bed of a stream of water and, if found necessary, may be secured by any suitable well-known means.

3 is a step within the column provided with a recess 4 to receive the lower end of the shaft 5, to which the wheel is secured, and said shaft rests upon suitable ball-bearings 6. The step may be supported in any preferred manner and is provided with openings 7 at the corners for the passage of water. In the bottom 8 of the step is an opening 9 for the discharge of water or mud, and in the column 2 are openings 10 for a like purpose.

11 indicates a float-platform which is provided with a depending sleeve 12, which surrounds and telescopes the column 2 and rises and falls thereon as the water in the stream rises and falls, due to tide or other causes. On the upper face of the float-platform is a boss 13, provided with an annular groove 14 to receive balls 14', and above said boss and properly secured to the shaft 5 by keys or splines 15 or in any other suitable manner is a collar 16, whose lower surface is provided with an annular groove 17, which registers with the groove 14 and, together with the balls 14', forms a ball-bearing for the water-wheel.

A track is supported on the upper surface of the float-platform 11 and is provided with a flat horizontal section 18 on one side of the shaft 5, inclined sections 19, only one of which is shown, and an elevated horizontal section 20 opposite the section 18, supported on posts 21.

In the collar 16 are radial recesses or pockets 22, in which are pivotally secured the inner ends of the paddles or blades 23 by pins 24 to enable the paddles to rise and fall as they pass over the track 18 to dip the paddles in the current and raise them at a point in the revolution of the wheel when the current is not effective, and thus relieve the wheel of the friction and resistance of the water on the paddles when they can do no work. The paddles are provided with revoluble grooved antifriction wheels or rollers 25, which engage the track 18 in the revolution of the wheel.

26 represents radial arms projecting from the collar 16 intermediate the paddles, and the latter are secured thereto by chains 27 for the transmission of the power of the current of water from the stream to the wheel proper.

Power may be transmitted from the water-wheel through the medium of a gear-wheel 28 or a pulley 29 and belt 30 or in any other preferred manner.

Having thus fully described my invention, what I claim is—

1. A water-wheel of the class described, provided with a fixed hollow column, a float-platform having a hollow extension telescopically engaging said hollow column, a shaft, and a wheel provided with paddles vertically movable at their outer ends, and means for raising and lowering said paddles.

2. A water-wheel of the class described, provided with a fixed hollow column having a step therein provided with a ball-bearing, a float-platform having a hollow extension telescopically engaging said hollow column, a shaft resting on said step, and a wheel provided with paddles vertically movable at their outer ends, and a track on said float-platform for raising and lowering said paddles.

3. A water-wheel of the class described, provided with a telescopic column, a float-platform having a track thereon, a shaft, a collar secured to said shaft, paddles pivotally secured to said collar, radial arms above the paddles, means connecting the paddles to the arms, and a support in said column for said shaft.

4. A water-wheel of the class described, provided with a telescopic column, a float-platform having a track thereon, a shaft, a collar secured to said shaft and provided with radially-arranged pockets, paddles pivotally secured in said pockets, radial arms above and intermediate the paddles, means connecting the paddles to the arms, and a support in said column for said shaft.

In testimony whereof I affix my signature in presence of two witnesses.

JOHN L. WEAVER.

Witnesses:
BENJ. A. DARE,
B. H. GUERR.